US00RE45863E

(19) United States
(12) Reissued Patent
Krakoff

(10) Patent Number: US RE45,863 E
(45) Date of Reissued Patent: Jan. 26, 2016

(54) BAG

(76) Inventor: Reed Krakoff, New York, NY (US)

(21) Appl. No.: 29/430,959

(22) Filed: Aug. 31, 2012

Related U.S. Patent Documents

Reissue of:
(64) Patent No.: Des. 625,516
Issued: Oct. 19, 2010
Appl. No.: 29/355,865
Filed: Feb. 16, 2010

(51) LOC (10) Cl. ..... 03-01
(52) U.S. Cl.
USPC ..... D3/245
(58) Field of Classification Search
USPC ..... D3/240, 241, 242, 243, 244, 245, 246, D3/232, 233, 218, 324; 150/100, 103–110, 150/113, 114, 118
See application file for complete search history.

(56) References Cited

U.S. PATENT DOCUMENTS

| | | | | | |
|---|---|---|---|---|---|
| D525,785 | S | * | 8/2006 | Suppancig | D3/246 |
| D526,120 | S | * | 8/2006 | Lee et al. | D3/233 |
| D545,567 | S | * | 7/2007 | Gerbi | D3/246 |
| D568,044 | S | * | 5/2008 | Kamiya | D3/246 |
| D569,610 | S | * | 5/2008 | Wang | D3/246 |
| D569,611 | S | * | 5/2008 | Gerbi | D3/246 |
| D587,010 | S | * | 2/2009 | Deck | D3/246 |
| D594,652 | S | * | 6/2009 | Guyon et al. | D3/243 |
| D604,507 | S | * | 11/2009 | Gerbi | D3/245 |

* cited by examiner

*Primary Examiner* — Phillip S Hyder

(74) *Attorney, Agent, or Firm* — Barry H. Fishkin

(57) CLAIM

I claim an ornamental design for a bag, as shown and described.

DESCRIPTION

Figure 1:
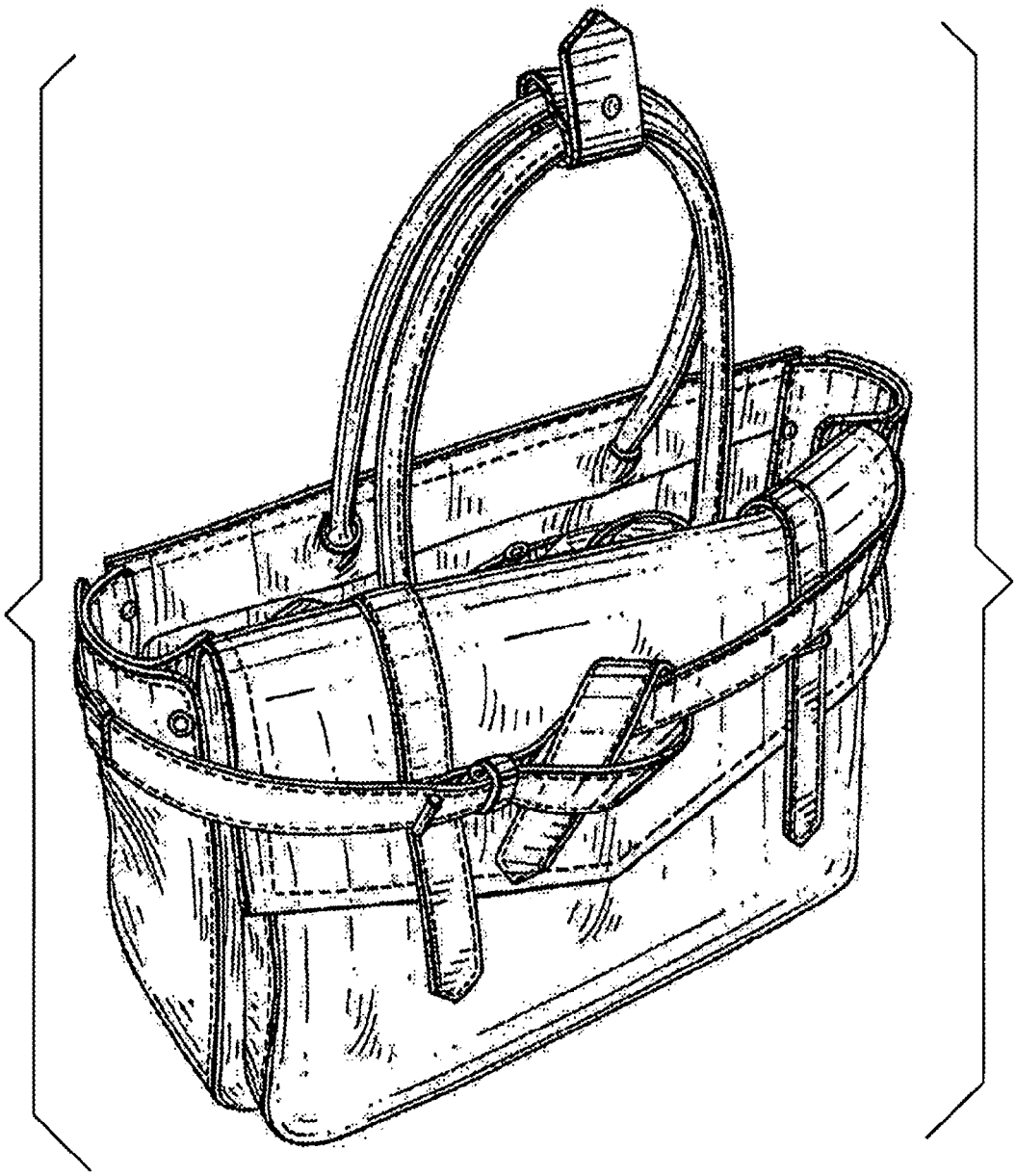
Figure 2:
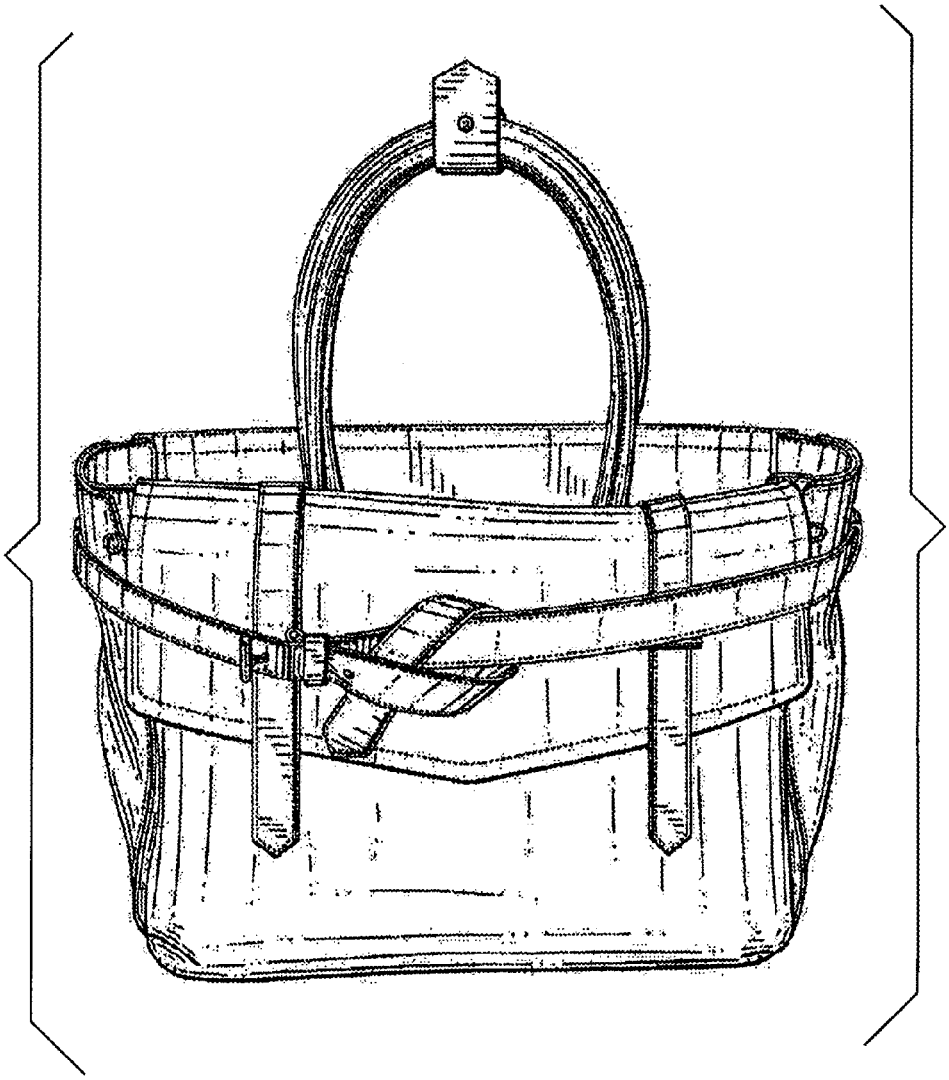
Figure 3:
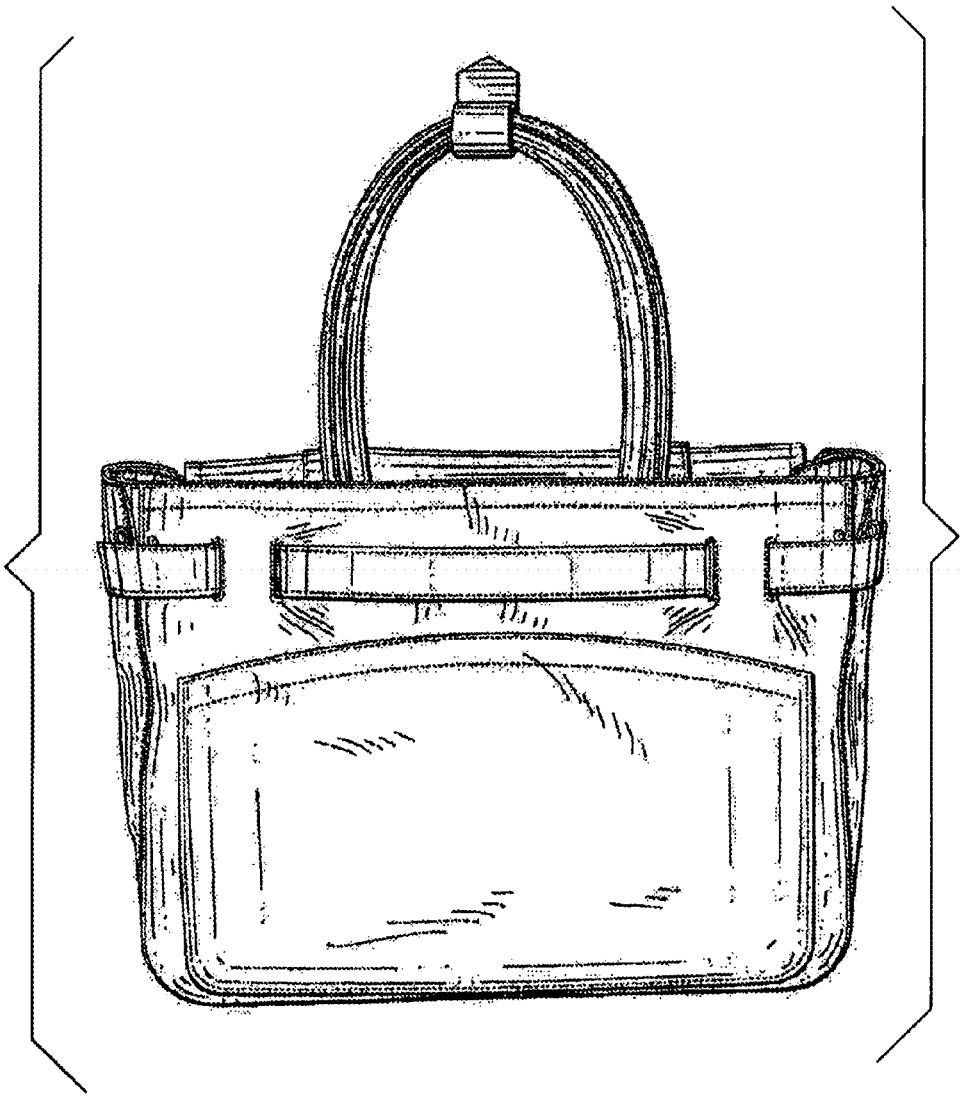
Figure 4:
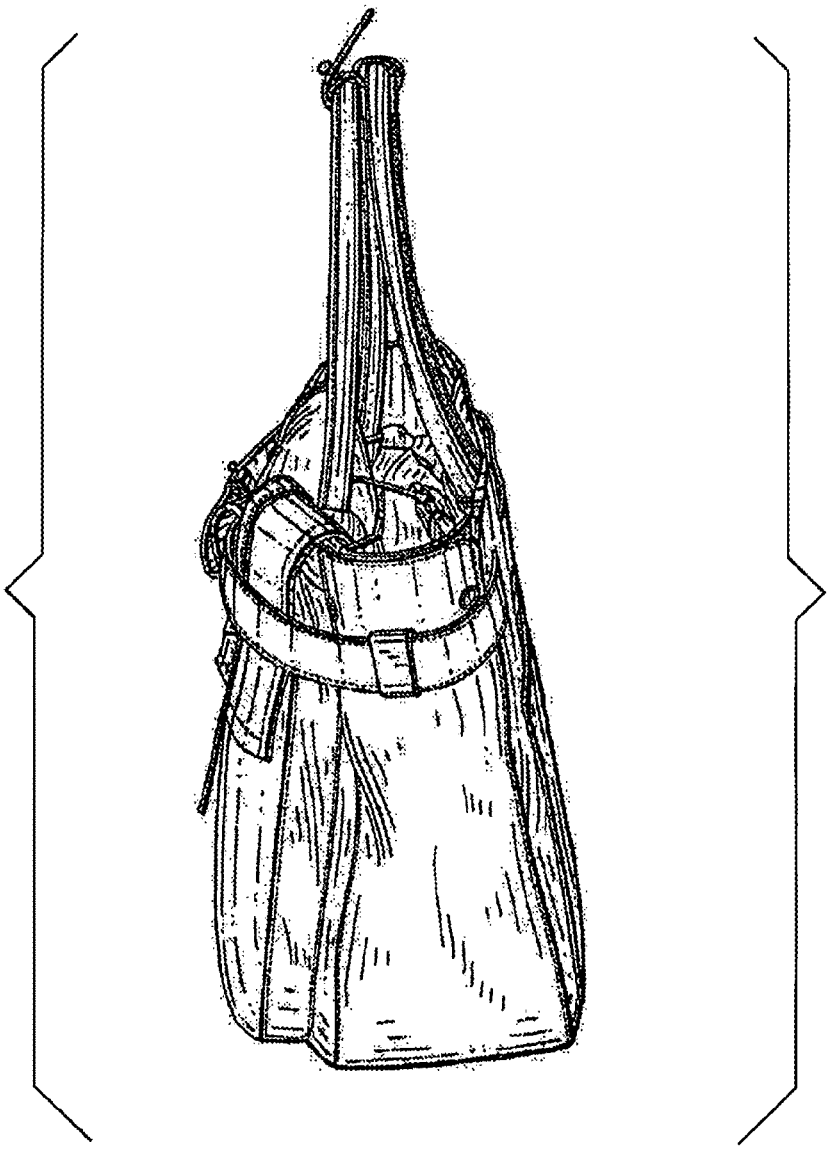
Figure 5:
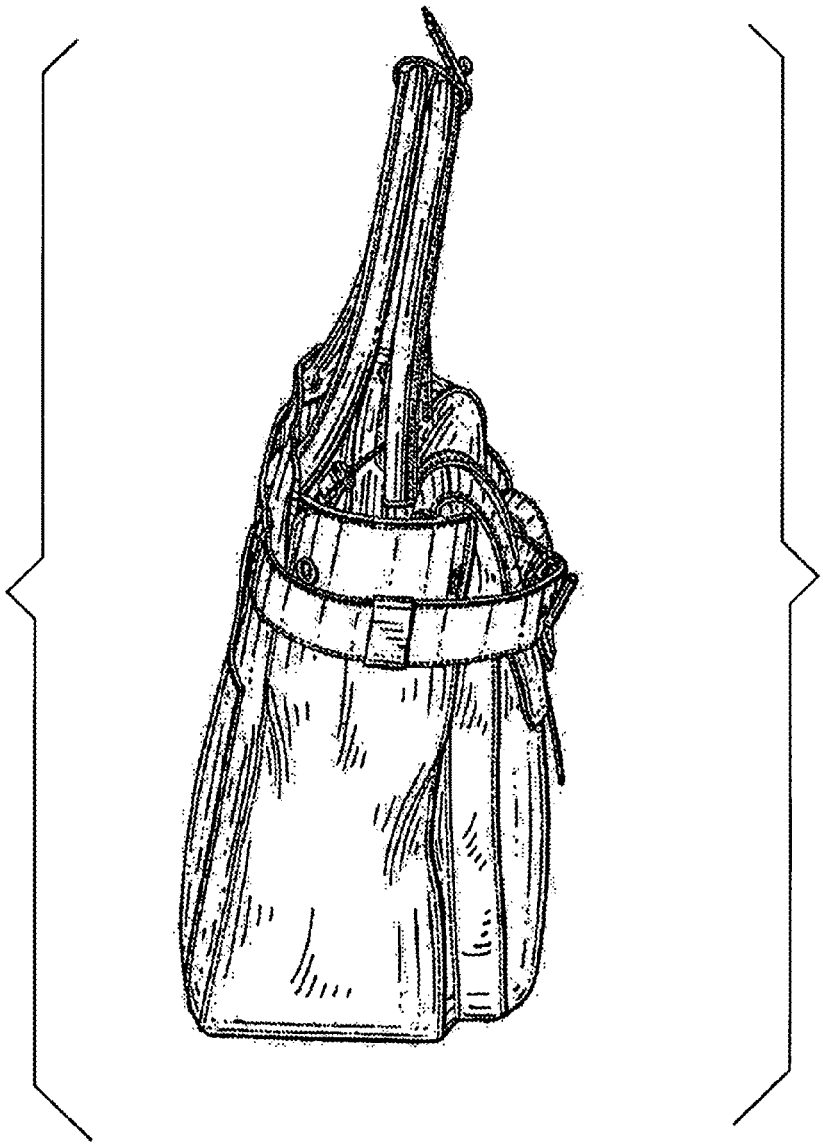
Figure 6:
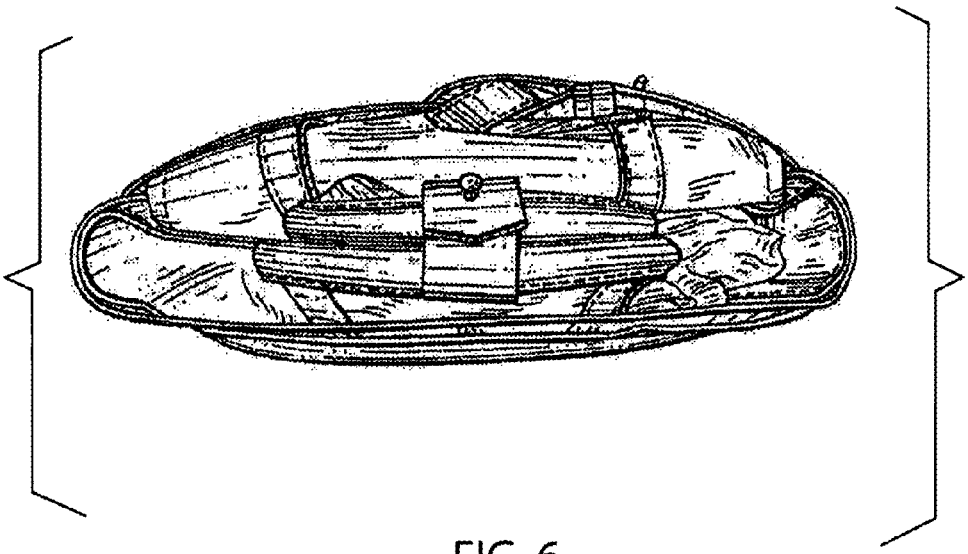
Figure 7:
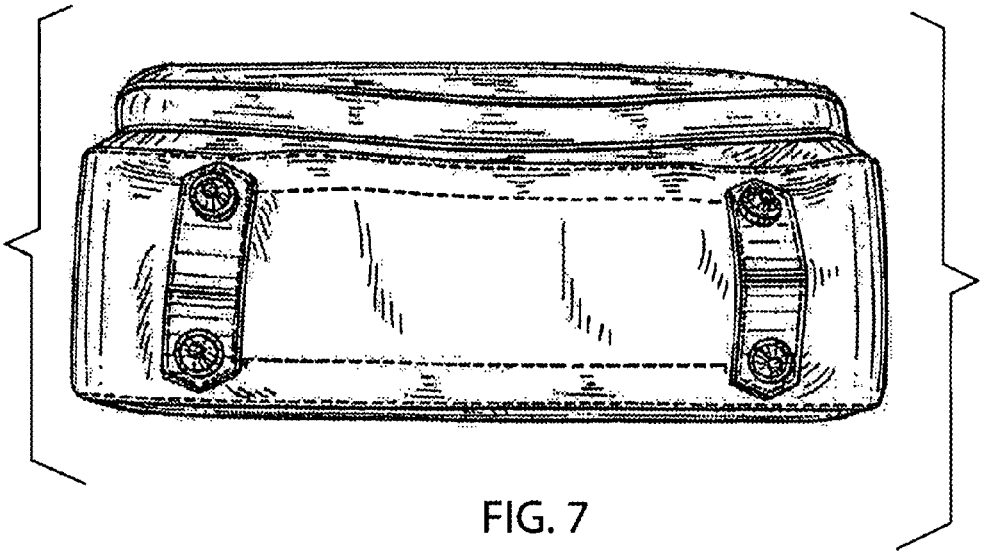

[FIG. 1 is a front perspective view of the claimed design.]
[FIG. 2 is a front elevational view of the claimed design.]
[FIG. 3 is a rear elevational view of the claimed design.]
[FIG. 4 is a right side elevational view of the claimed design.]
[FIG. 5 is a left side elevational view of the claimed design.]
[FIG. 6 is a top view of the claimed design; and,]
[FIG. 7 is a bottom view of the claimed design.]
*FIG. 8 is a front perspective view of a bag showing my new design;*
*FIG. 9 is a front perspective view of the bag shown in FIG. 8;*
*FIG. 10 is a rear perspective view thereof;*
*FIG. 11 is a right perspective side view thereof;*
*FIG. 12 is a left perspective side view thereof;*
*FIG. 13 is a top view of the upper end of the bag, the lower end of the bag being omitted from the view for ease of illustration; and*
*FIG. 14 is a bottom view thereof.*
*The broken line showing of the handles, grommets, handle clasp, straps, belt, belt holes, belt loops and the hook fastener closure element in FIGS. 8-14 depict portions of the bag in which the design is embodied that are not claimed. In addition, for clarity, the stitching on the unclaimed subject matter is shown in lines of dot-dash-dot-dash. The stitching on the claimed subject matter is shown by dotted lines.*

1 Claim, 13 Drawing Sheets

Matter enclosed in heavy brackets [ ] appears in the original patent but forms no part of this reissue; matter printed in italics indicates the additions made by reissue.

(NEW)

(Canceled)

(Canceled)

(Canceled)

(Canceled)

(Canceled)

(Canceled)

(Canceled)

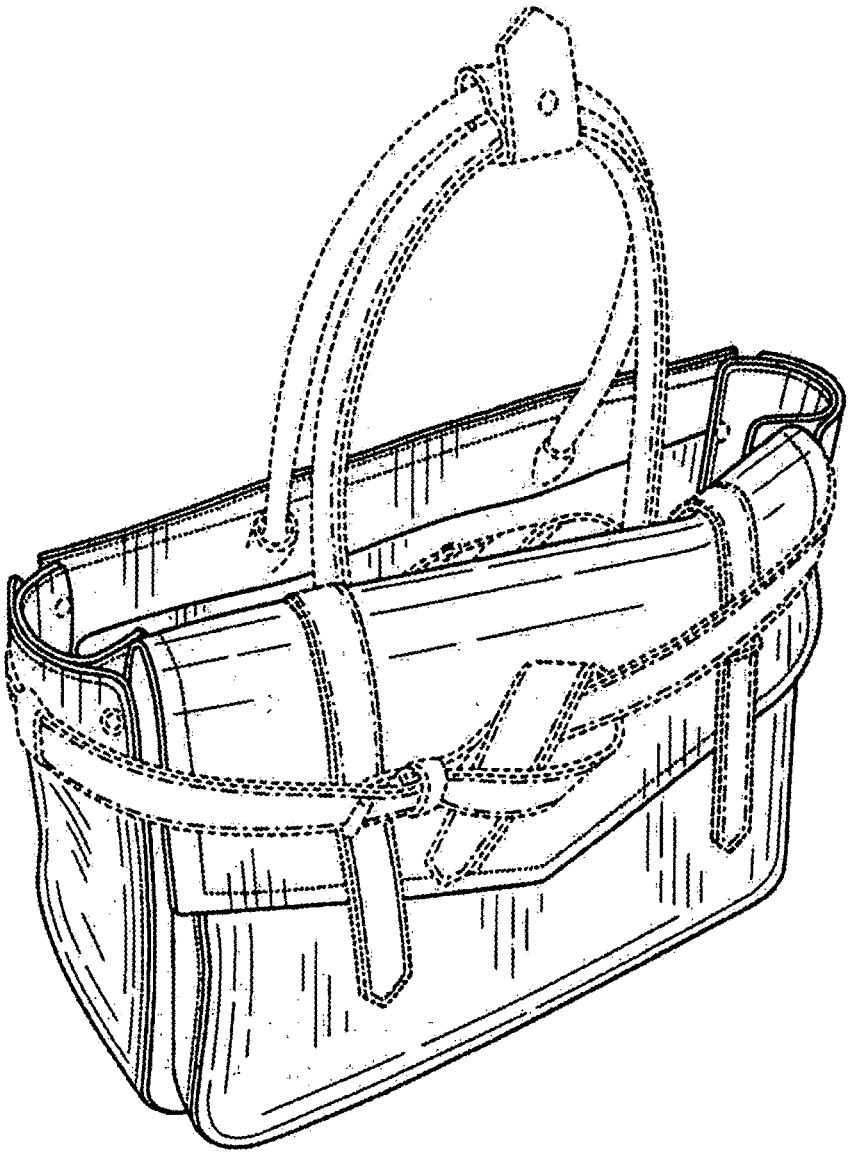
FIG. 8
(NEW)

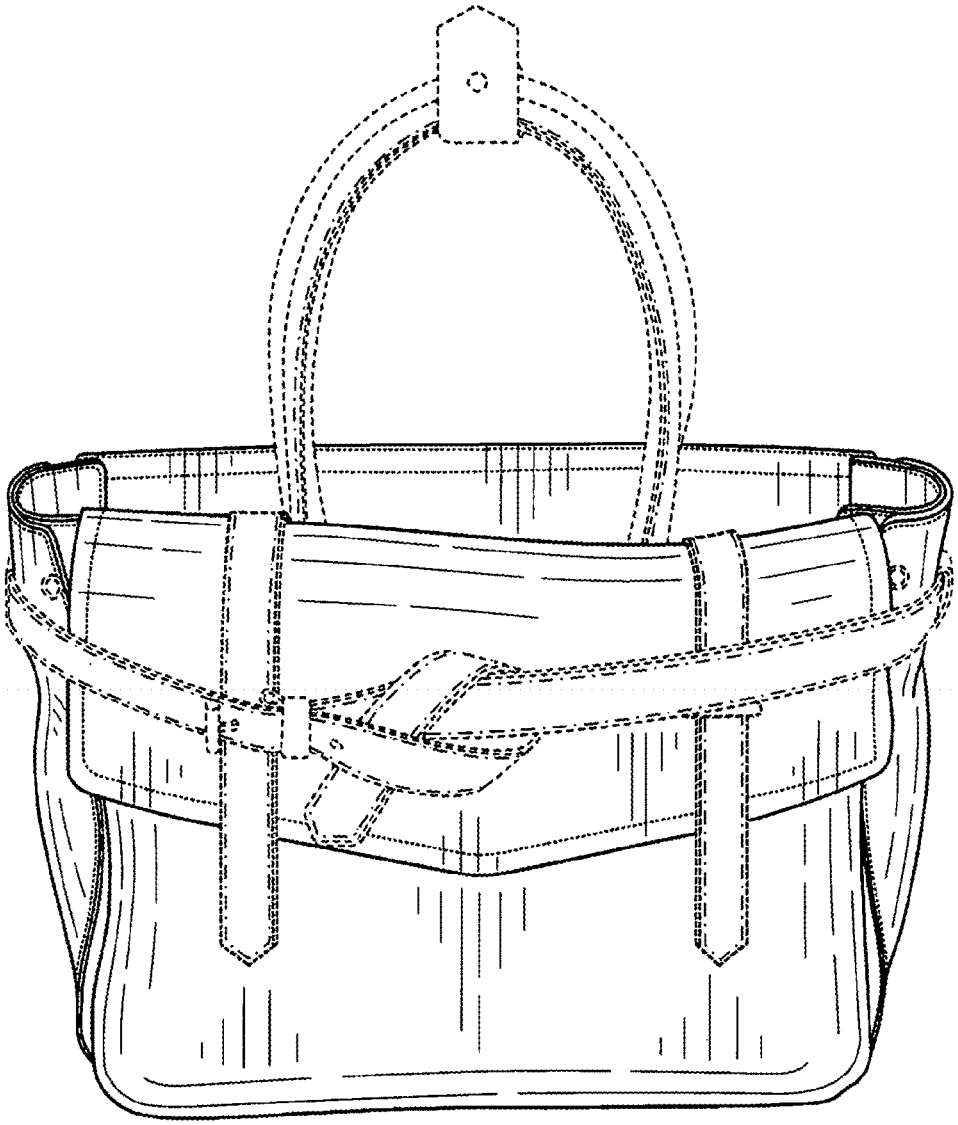
FIG. 9
(NEW)

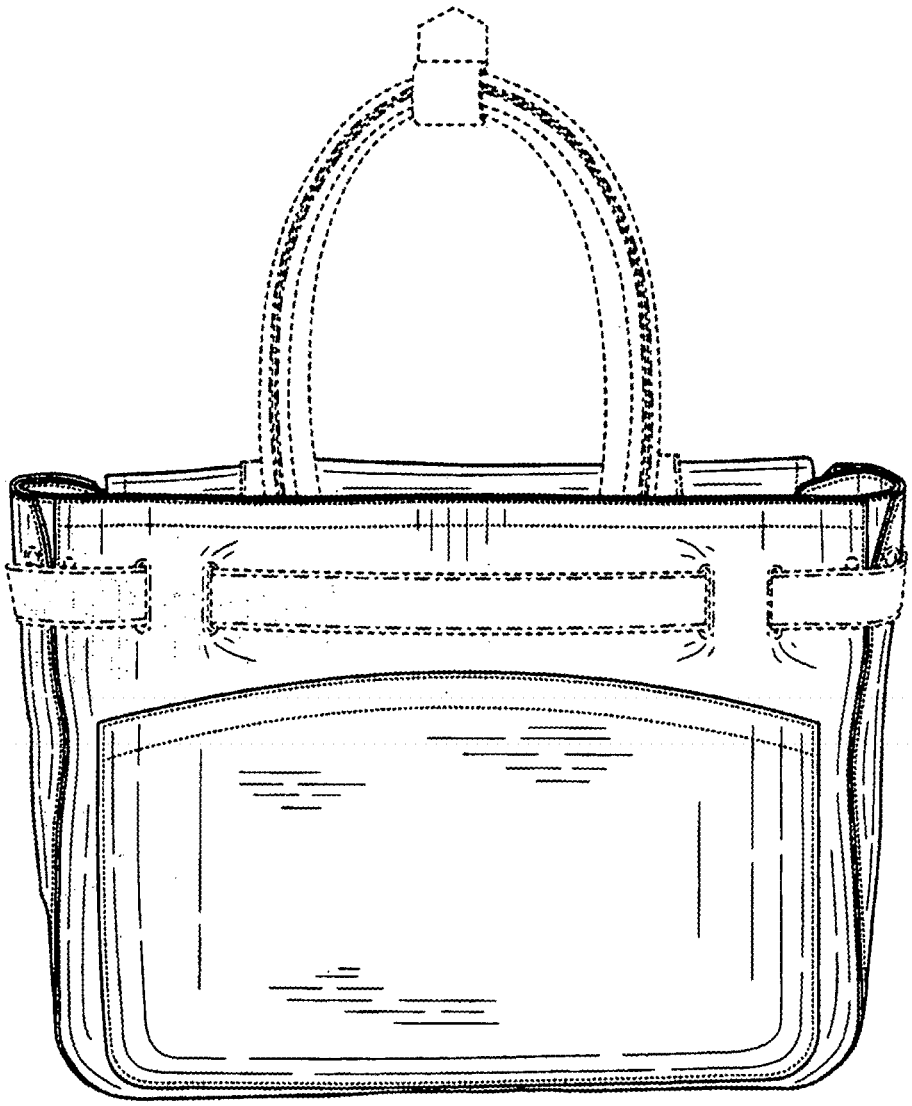
FIG. 10
(NEW)

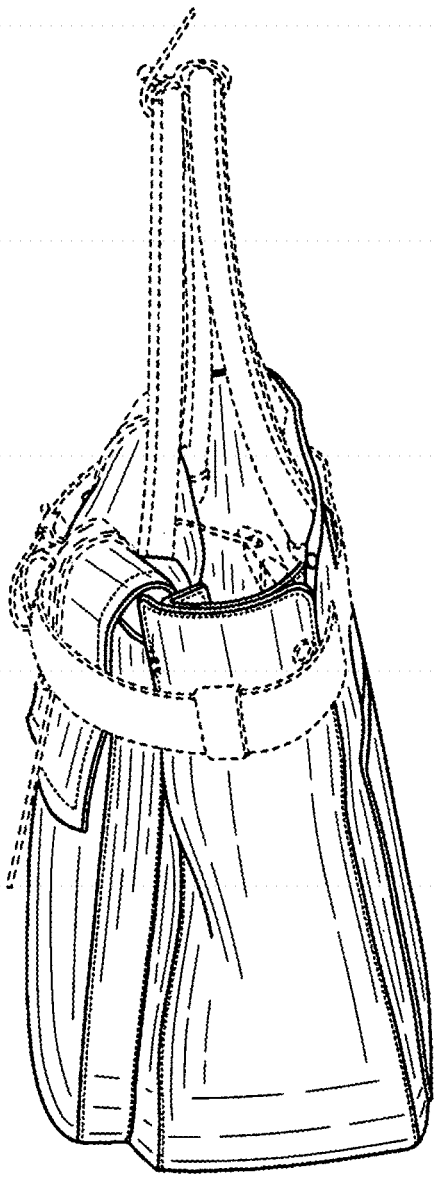
FIG. 11
(NEW)

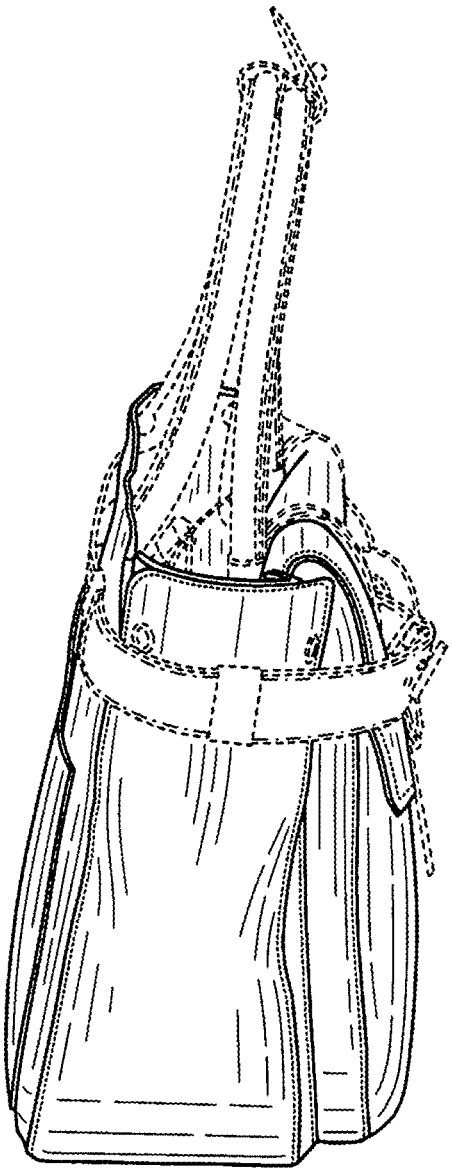
FIG. 12
(NEW)

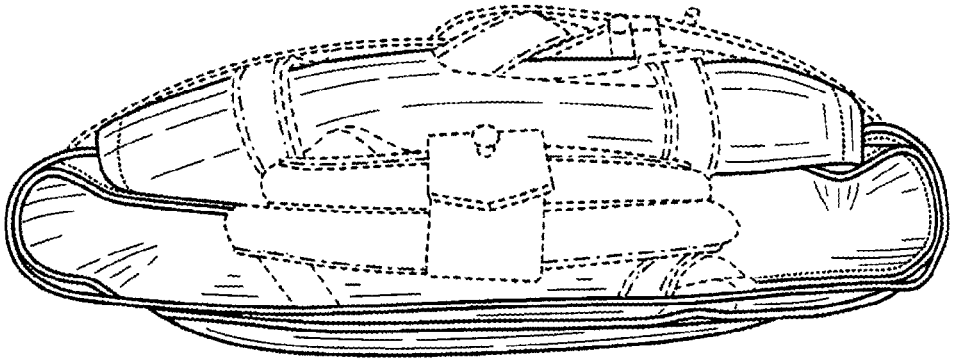
FIG. 13
(NEW)

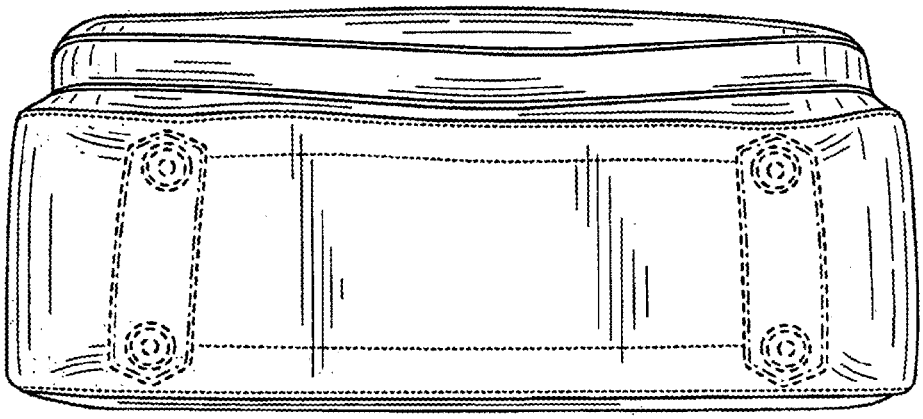
FIG. 14
(NEW)